Jan. 14, 1947.　　　H. F. ALFERY　　　2,414,220
TEMPERATURE CONTROL AND SAFETY SHUTOFF
Filed May 13, 1943　　　3 Sheets-Sheet 2
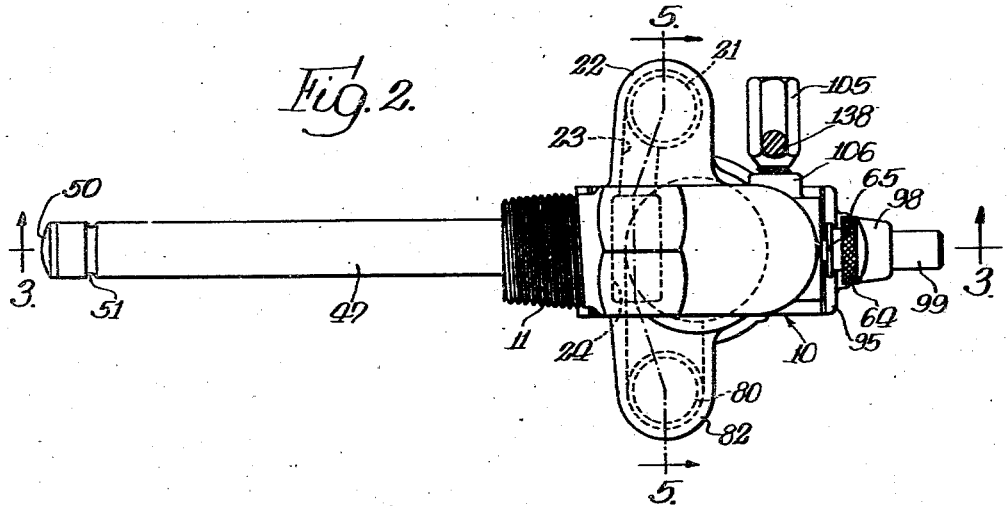
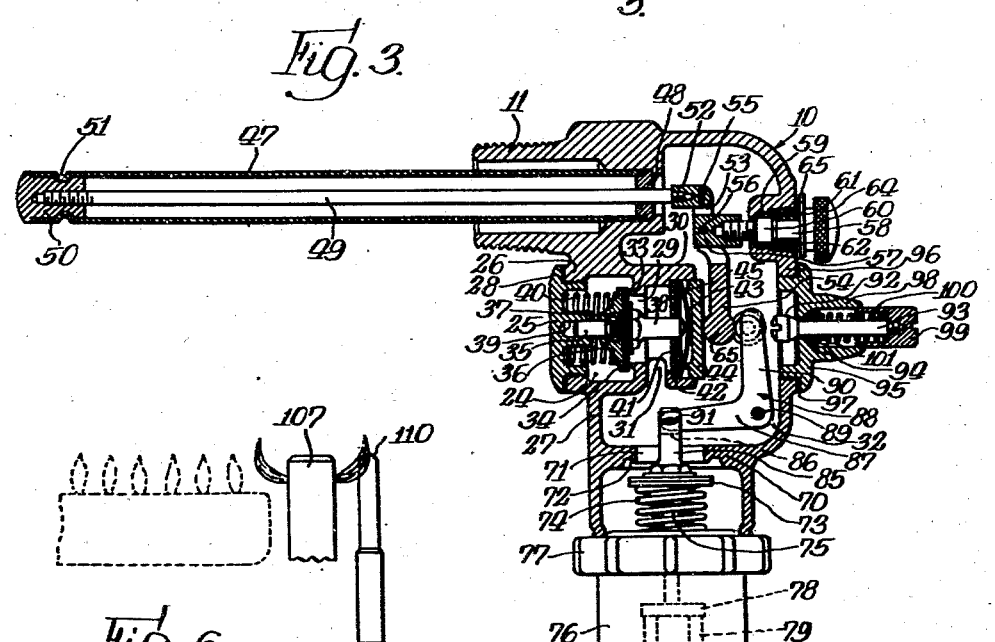
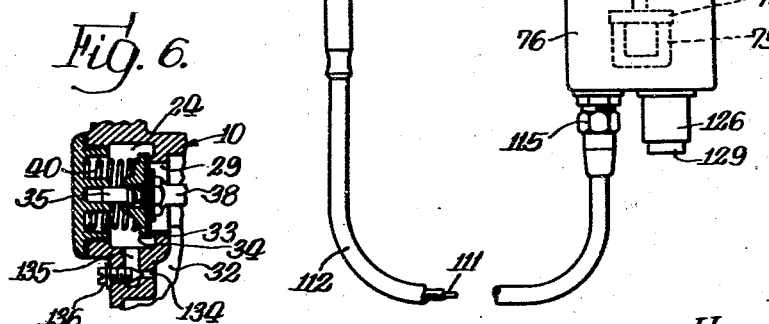
Inventor:
Henry F. Alfery.
By [signature]
Atty's.

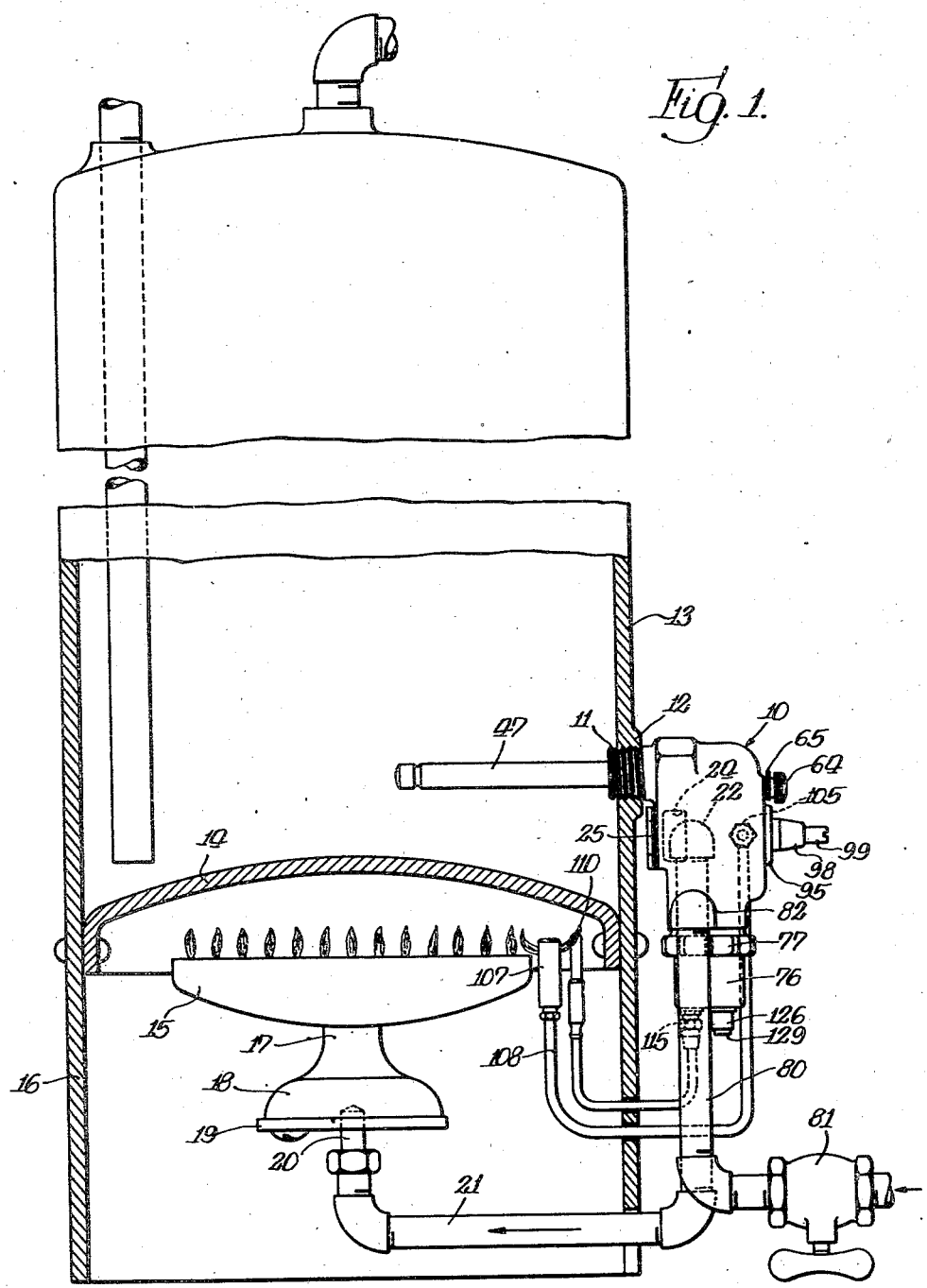

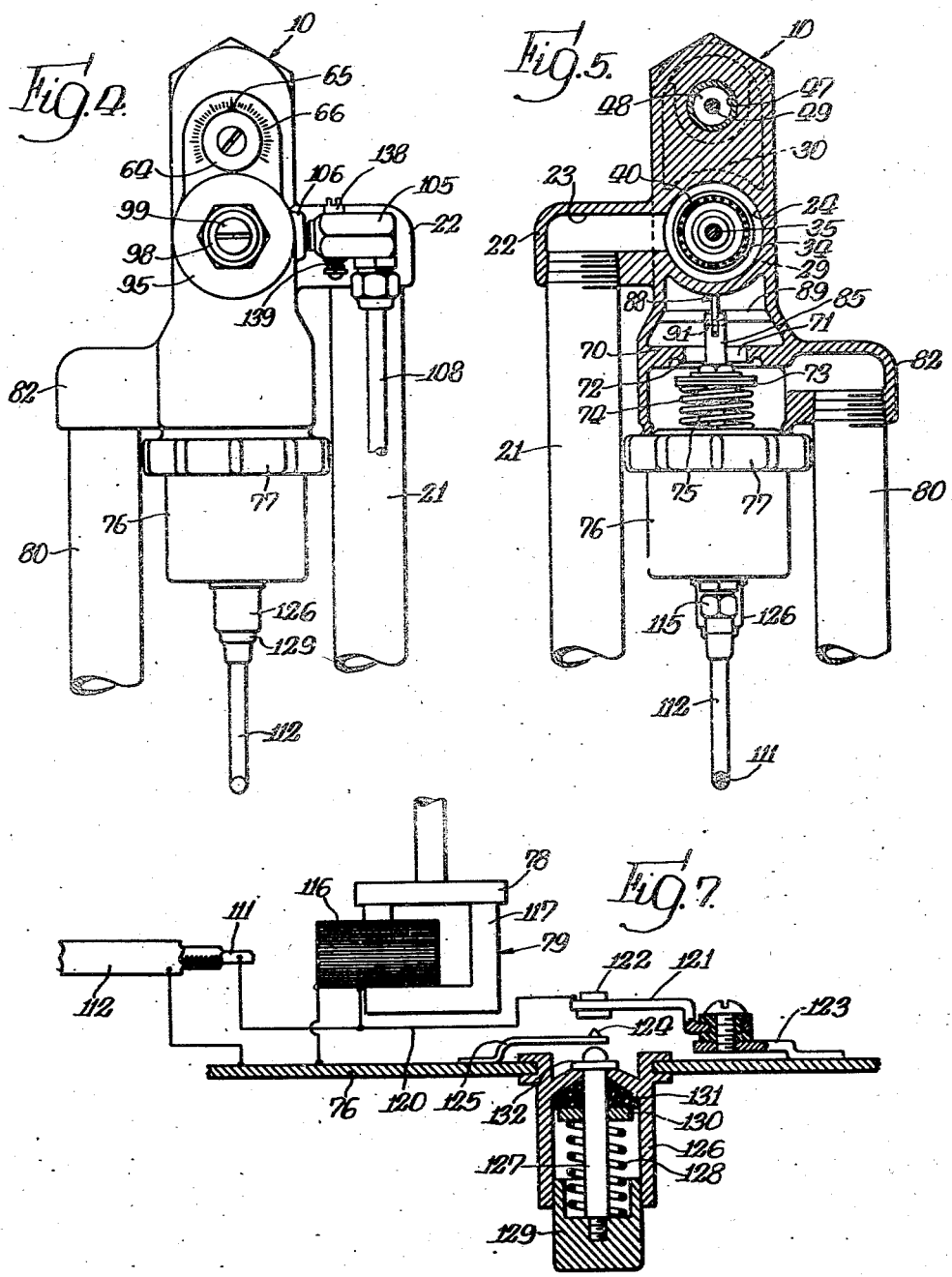

Patented Jan. 14, 1947

2,414,220

UNITED STATES PATENT OFFICE 2,414,220

TEMPERATURE CONTROL AND SAFETY SHUTOFF

Henry F. Alfery, Milwaukee, Wis., assignor to Milwaukee Gas Specialty Company, Milwaukee, Wis., a corporation of Wisconsin Application May 13, 1943, Serial No. 486,844

13 Claims. (Cl. 236—21)

This invention relates to control systems for heating a body of fluid and maintaining it at a desired temperature, within predetermined limits, and has to do with such a system embodying temperature control and safety shutoff means.

My invention is directed to a system of the character stated having a main burner and thermostatic means for automatically controlling flow of fuel to the burner in accordance with the temperature of the fluid heated thereby, there also being means for materially reducing or completely shutting off flow of fuel to the main burner in case the temperature of the fluid being heated thereby exceeds a predetermined desired maximum. More specifically, I provide a conduit structure for supplying fuel to the main burner, this structure having an inlet chamber and an outlet chamber, supply of fuel to the inlet chamber being controlled by conditions at the main burner for shutting off the supply of fuel thereto in the event of extinguishment of a pilot burner associated with the main burner, or of the main burner, means also being provided for controlling supply of fuel from the inlet chamber to the main burner responsive to variations in temperature of the fluid heated by the main burner, there being means for resetting a valve controlling supply of fuel to the inlet chamber, and there also being means supplementary to the temperature responsive means for disabling the resetting means when the temperature of the fluid being heated exceeds a desired predetermined maximum, this latter means enabling the resetting means when the temperature of the fluid falls to or below the desired maximum. The means controlling admission of fuel to the inlet chamber comprises a main control valve yieldingly urged in closing direction and, in the normal operation of the control means, held in open position by an electromagnet energized by an electric current generated by a thermocouple heated by a pilot burner associated with the main burner, or by the main burner itself, and manually operable means is provided for releasing the main control valve from the electromagnet and thus completely shutting off flow of fuel to the main burner independently of the temperature of the fluid heated by that burner, when desired.

Further objects and advantages of my invention will appear from the detail description.

In the drawings:

Figure 1 is a side view, of a hot water boiler or tank, partly broken away and in section, with control means embodying my invention applied thereto;

Figure 2 is a plan view of the control means shown in Figure 1;

Figure 3 is a sectional view taken substantially on line 3—3 of Figure 2, certain parts being shown in elevation and certain parts being broken away;

Figure 4 is a front view of the control means of Figure 2;

Figure 5 is a sectional view taken substantially on line 5—5 of Figure 2, certain parts being shown in elevation;

Figure 6 is a fragmentary sectional view of the outlet chamber portion of the valve body, showing a modified form of my invention; and Figure 7 is a diagrammatic view of the electromagnet and the armature for holding the main control valve in open position, this view showing also the manually operable switch means for releasing the armature from the frame of the electromagnet, and the associated circuits.

I have illustrated the control means of my invention as used in connection with a hot water heater, by way of example, but it is to be understood that the control means of my invention is not limited to this particular use and may be employed for all analogous purposes or for any other purpose to which it is suited.

The control means of my invention comprises a suitably formed valve housing or body 10 provided at its upper end with an exteriorly threaded nipple 11 which, in the use of my invention illustrated, is threaded through a boss 12 of a hot water tank 13. Tank 13 is provided with an upwardly domed bottom wall 14 beneath and adjacent which is suitably mounted a gas burner 15 of known type, disposed within a chamber defined by wall 14 and the lower depending skirt portion 16 of tank 13. The burner 15 is provided with a conduit 17 flared at its lower end portion to provide a mixing chamber 18, at the lower end of which is mounted an adjustable disc 19 provided with openings, for regulating the amount of air entering mixing chamber 18, as is well known. Disc 19, and the bottom wall of chamber 18 are provided with openings centrally thereof for reception of a tip 20 suitably mounted on the upturned end of a fuel supply pipe 21 passing through a suitable opening in skirt portion 16 of tank 13.

The other end of pipe 21 is screwed into a projection 22 extending from one side of valve body 10 at the upper portion thereof, which projection is suitably bored and tapped for that purpose.

Projection 22 is provided with a passage 23 therein opening into a cylindrical outlet chamber 24 closed at its outer end by a flanged screw cap 25 threaded into thickened portion or boss 26 of back wall 27 of body 10, with an intervening gasket 28. The inner end wall of chamber 24 is provided with a valve port 29 opening therethrough into a neck 30 forming an integral inward extension of chamber 24 and provided with a circumferentially extending slot 31 opening into inlet chamber 32 of valve body 10. The inner end wall of chamber 24 is provided with a raised outwardly extending rib 33 providing a seat for a suitably faced valve 34 controlling port 29. Valve 34 is attached to the inner or forward end of a valve stem 35 for outward movement therewith, by means of a U-shaped retainer 36 of known type engaging in a corresponding circumferential groove in stem 35. The inner end of stem 35 abuts a reduced screw stud 37 of an inner valve stem 38, secured to valve 34 coaxially with stem 35 by means of stud 37. The outer portion of valve stem 35 is slidable in a hollow boss 39 integral with and projecting inward from the inner face of cap 25, this cap being recessed from its inner face for reception of the outer end portion of a coil compression spring 40 seating therein and confined between cap 25 and valve 34, this spring yieldingly urging the valve toward its inner or closed position.

Valve stem 38 is slidable, at its inner end portion, through a disc 41 seating against a shoulder in the rabbeted inner end portion of neck 30, this disc having an inwardly extending circumferential flange 42 on which seats the edge of a spring steel snap disc 43 of concavo convex cross section, of known type. A plunger 44 is slidably mounted in the inner end of neck 30 and is provided, at its outer face, with an annular projection or rib 45 of substantially V shape in cross section, which contacts snap disc 43 a short distance from the edge thereof. In Figure 3 the snap disc 43 is shown in its inwardly bulged position, thus permitting closing of valve 34 by compression spring 40, which serves to hold this valve closed. Outward movement of plunger 44 exerts pressure upon snap disc 43 adjacent the circumference thereof, by means of element 45, thus deforming disc 43 which, when deformed to a certain extent, will snap to its other position so as to be bulged outward, the disc 43 in its outward movement contacting the inner end of valve stem 38 and forcing the same outward, thus opening valve 34 in opposition to compression spring 40 and holding the valve 34 in its open position. In that connection, it is to be noted that the pressure contact of element 45 with the snap disc 43, a short distance inward from the edge of the latter, in conjunction with the edge of disc 43 seating on rim 42 of the disc 41, supplements the snap action of disc 43 so as to assure opening of valve 34 and maintaining of this valve open by disc 43; in the manner stated. Upon inward movement of follower 44 to about its position shown in Figure 3, element 45 no longer exerts effective pressure contact upon disc 43, with the result that this disc may now be moved inwardly by the pressure exerted by compression spring 40 until it snaps over center into its full line position shown in Figure 3, outlet valve 34 being then closed by compression spring 40 and held closed thereby until snap disc 43 is again snapped outward.

Nipple 11 is provided with a bore of step formation in which is secured one end portion of a tube 47 in which is mounted, at said end, a flanged plug 48. A rod 49 extends slidably through plug 48 into the upper portion of inlet chamber 32 of the valve housing 10, the outer end portion of this rod being screwed or otherwise suitably secured in a flanged closure plug 50 secured in the outer end of tube 47 in any suitable manner to provide a fluid-tight and pressure-resistant closure therefor, conveniently by a circumferential bead 51 pressed inwardly from tube 47 into a corresponding groove in plug 50. The tube 47 is formed of a suitable metal, and has a coefficient of expansion much greater than that of rod 49, the coefficient of expansion of which preferably is quite small. Tube 47 and rod 49 together constitute a thermostat immersed in the water within tank 13 heated by burner 15, so that this thermostat is subjected to heat generated by the burner. As the temperature to which the thermostat is subjected increases, tube 47 expands and moves rod 49 outward and, upon a decrease in temperature, tube 47 contracts and moves rod 49 inward of the valve housing 10. The inner end of rod 49 is secured in a connecting block 52 disposed between two arms, one of which is shown at 53, of the upper slotted portion of a valve operating lever 54 to which block 52 is loosely pivoted at 55. Lever 54 is pivoted, intermediate its ends, at 56, on a mounting block 57 disposed between arms 53, this block 57 being threaded onto the inner end portion of an adjusting screw 58 rotatably mounted through a stuffing box 59 of housing 10. Screw 58 is provided, on its stem portion, with an enlargement 60 cooperating with the inner end of the stuffing box structure and with a follower 61 and a nut 62 screwing into the outer end of the stuffing box, for confining screw 58 against endwise movement. At its outer end screw 58 is provided with an enlarged head 64, preferably knurled, carrying, at its inner end, and index member 65 provided with a point or index element movable over a suitably graduated scale 66 on the outer surface of valve housing 10. The lower end portion of lever 54 is of increased thickness and rounded as shown, at 65, and contacts the inner face of follower 44 centrally thereof. In Figure 3 the lever 54 and associated parts are shown in the positions which they occupy when outlet valve 34 has been closed responsive to a desired maximum temperature to which the thermostat is subjected. After closing of valve 34, the temperature of the thermostat decreases and rod 49 is forced inward of valve housing 10, thus forcing the lower end of lever 54 outward, that is, toward outlet chamber 24, with corresponding outward movement of follower 44. When the temperature to which the thermostat is subjected has decreased to the desired minimum, the outward movement of plunger 44 causes outward flexing of the snap disc 43, thus opening valve 34 and maintaining it open until the desired maximum temperature has been again attained, at which time lever 54 will have been returned to its position shown in Figure 3 and the valve 34 will be closed by compression spring 40, in the manner previously described. By means of the screw 58, the pivot 56 of lever 54 can be adjusted inward and outward, within limits, so that the thermoresponsive means for opening and closing the outlet valve 34 can be adjusted with facility for operation of this valve at any desired predetermined minimum and maximum temperatures, within limits.

Valve housing 10 is provided, at the lower end of inlet chamber 32 thereof, with a partition 70 with an inlet valve port 71 extending therethrough, the under face of partition 70 being recessed concentrically with port 71 to provide a downwardly extending valve seat element 72 about port 71. An inlet valve 73 of suitable construction controls port 71, this valve being urged in closing direction by a compression spring 74 disposed about valve stem 75 and confined between valve 73 and the upper or inner end of an electromagnet housing 76 secured to the lower end of valve housing 10 by a flanged nut 77, or in any other suitable manner. An armature 78 is attached to the lower end of valve stem 75 and, in the open position of valve 73, is disposed in its attracted position in which it is held by an electromagnet 79 within housing 76, when the electromagnet is energized. When valve 73 is in its closed position the armature 78 is in its released position spaced away from the electromagnet 79, the latter being effective, when energized, for holding the armature 78 in attracted position in opposition to compression spring 74 but ineffective for moving the armature 78 from its released position to its attracted position. Under normal operating conditions, the electromagnet 79 is energized and inlet valve 73 is held by the electromagnet in its open position. A gas supply pipe 80, provided with a shutoff cock 81 of known type, leads from a suitable source of supply of gas, or other fuel of suitable character, this pipe screwing at its upper end into a lateral projection 82 extending from the opposite side of valve housing 10 from the projection 22, projection 82 being disposed at the lower portion of valve housing 10 and opening into the latter below partition 70. Under normal conditions, the gas cock 81 is open, and when valve 73 is in its open position, gas flows into inlet chamber 32 from which it may flow through pipe 21 to the main burner 15, under control of the outlet valve 34.

Inlet valve 73 is provided with a stem 85, coaxial with and constituting in effect a continuation of stem 75, projecting therefrom upward through the inlet opening 71. The upper end portion of stem 85 is slotted at 86 for reception of the end portion of lower arm 87 of an angle or bell crank lever 88 pivoted at 89 in chamber 32. The other arm 90 of lever 88 extends upward generally along the outer or front wall of housing 10, and arm 87 is loosely pivoted at 91 to the valve stem 85. The upper end portion of arm 90 is disposed between the enlarged lower portion 65 of lever 54 and head 92 at the inner end of a reset stem 93 slidable through a stuffing box 94 of a flanged screw cap 95 threaded through thickened portion or boss 96 of the front wall of housing 10, with an intervening gasket 97. The stuffing box 94 comprises a tubular extension 98 in which is slidably mounted a reset button 99 secured on the outer end of stem 93 and recessed from its inner end, as shown. A coil compression spring 100 seats in the recessed inner end portion of button 99, between which and washer 101 of the stuffing box 94 spring 100 is confined. The spring serves to urge stem 93 outward and also to compress the packing of the stuffing box to provide a fluid-tight seal about the stem.

When inlet valve 73 is released from electromagnet 79, it is moved upward by the compression spring 74 into its closed position, in which position of this valve arm 90 of lever 88 is disposed adjacent head 92 of reset stem 93, arm 90 being spaced away from head 92 when the valve 73 is in its open position, as shown in Figure 3. In order to reset the valve 73 to open position, the reset stem 93 is moved inward of housing 10 into contact with arm 90 of angle lever 88, thus swinging this lever, in the continued inward movement of reset stem 93, in a counterclockwise direction, as viewed in Figure 3, and moving valve 73 into its open position and the armature 78 into its attracted position adjacent electromagnet 79, the latter, if energized, then serving to retain valve 73 in its reset or open position. Arm 90 is disposed adjacent the lower enlarged portion 65 of lever 54, when valve 73 is in its open position and lever 54 is in the position which it occupies when the thermostat, comprising the tube 47 and rod 49, has been heated to the desired maximum temperature, or, more correctly, the body of fluid surrounding and in contact with the thermostat has been heated to the desired maximum temperature. That permits resetting of the inlet valve 73 to its open position, in the manner above described. In the event the desired maximum temperature is exceeded and the water or other fluid is heated to an objectionably high temperature, lever 54 is turned in counterclockwise direction about its pivot 56, as viewed in Figure 3, into a position in which the lower enlarged portion 65 thereof contacts arm 90 and swings lever 88 in clockwise direction, thus forcing armature 78 away from electromagnet 79 and releasing the valve 73, which is then closed by spring 74. So long as the objectionably high or excessive temperature persists, lever 54 remains in position obstructing inward movement of arm 90 of lever 88, thus disabling the resetting means and preventing reopening of the inlet valve 73. That guards against supply of fuel to the burner 15 in the event outlet valve 34 should remain open, due to sticking or other causes, after the water or other fluid has been heated to the desired maximum temperature. In such event, the lever 54 would function to assure closing of valve 73, while also preventing opening thereof until the water or other fluid cools to or below the desired maximum temperature.

When the control means of my invention is applied to a hot water boiler or analogous apparatus, I preferably provide thermocouple means for energizing the electromagnet 79, such means being heated by a pilot burner associated with the main burner, or, in certain cases, by the main burner itself. A fitting 105 is screwed into a boss 106 extending from one side of valve housing 10, and opens into inlet chamber 32. A pilot burner 107, of suitable known type, is connected by a tube 108 to fitting 105 for supplying fuel to the pilot burner from a point between the inlet and outlet valves. So long as the inlet valve 73 remains in its open position, fuel will be supplied to the pilot burner which, after ignition thereof, burns continuously and serves to ignite the main burner, after extinguishment of the latter, when supply of fuel thereto is reestablished by opening of the outlet valve 34. The electromagnet 79 and the means for energizing it may be similar to the electromagnet and the energizing thermocouple therefor disclosed in my Patent No. 2,276,909. The thermocouple has a hot junction 110 disposed in proximity to the pilot burner 107 so as to be heated by the flame thereof. The internal element of the thermocouple is suitably joined to a lead conductor 111 disposed within and insulated from a metallic tube 112 suitably joined to the other or external element of the thermocouple and constituting a second lead conductor. This thermocouple may be similar to that disclosed in the patent to Oscar J. Leins, No. 2,126,564, or may be of any other suitable type. The thermocouple means is attached to the electromagnet housing 76 by connector means 115 effective for connecting lead 111 to one terminal of an energizing coil 116, disposed about one leg of frame 117 of the electromagnet 79, and for connecting the tubular lead 112 to the other terminal of coil 116. The connector means referred to may be similar to that disclosed in my Patent No. 2,276,909, mentioned above, and need not be illustrated nor described here in greater detail. Suffice it to state that the electromagnet 79 is provided with a coil energized from a suitable source of electric current, preferably by means of a thermocouple heated by a pilot burner associated with the main burner, or, in certain cases, by the main burner. I also provide means whereby the inlet valve 73 may be released from the electromagnet 79 so as to be moved into closed position, independently of the automatic control means above described. This latter means is similar to the manual release of my Patent No. 2,276,909, and a brief description thereof will suffice. The terminal of coil 116, which is connected to lead 111, is also connected, by a lead 120, shown in Figure 7, to a bracket 121 carrying a contact member 122 and secured to but insulated from a bracket 123 suitably mounted on the lower end wall of electromagnet housing 76. Contact member 122 cooperates with a contact point 124, carried by a resilient metal strip or contact spring 125 secured to the lower end wall of housing 76 in electrical conducting relation thereto. A tubular fitting 126 is suitably secured at its upper end to housing 76, within an opening through the lower end wall thereof, and slidably receives a plunger 127 normally held outward by a coil compression spring 128 seating at its outer or lower end in the recessed inner end portion of a button 129 secured on the outer end of plunger 127. Spring 128 is confined between button 129 and a washer 130 seating on packing material 131 compressed about plunger 127 to provide a fluid tight closure thereabout. Outward movement of plunger 127 is limited by a flange 132 thereon, adjacent the inner end thereof, and the inner end of this plunger is disposed in alignment with the free end portion of the contact spring 125. It will be seen that by pushing the button 129 inward or upward, spring 125 is deformed and contact point 124 may be moved into contact with contact member 122. Since lead conductor 111 is connected to housing 76 and the contact spring 125 is also connected to housing 76, when the contact point 124 is moved into contact with the contact member 122, the current generated by the thermo-couple is shunted around the coil 116, thus deenergizing the electromagnet and releasing the armature 78 therefrom, permitting closing of valve 73. The button 129 and associated parts thus provide manual release means whereby the valve 73 may be closed at the will of the operator, independently of the temperature of the water or other fluid being heated by the main burner. It is to be understood that, within the broader aspects of my invention, any other suitable means may be provided for energizing the electromagnet, and any other suitable means may be provided for releasing the inlet valve from the electromagnet or, if desired, such release means may be omitted, though it is preferred.

The modified form of my invention illustrated in Figure 6 is similar to that of Figure 3, except that the valve body or housing 10 is provided with a duct or passage 134 opening from inlet chamber 32 into an offset 135 of outlet chamber 24. A regulating screw 136, having a tapered inner end, is threaded through the wall of housing 10 with, in its innermost position shown in Figure 6, the tapered inner end thereof extending into the outer end of duct 134 and providing therewith a restricted annular orifice through which gas or other fuel may flow from inlet chamber 32 into outlet chamber 24, so long as the inlet valve 73 is open, providing means for supplying to the burner 15 a restricted amount of fuel for dim or low operation thereof, sufficient to maintain the water within boiler 13 at approximately the desired maximum temperature during periods when water is not being withdrawn from the boiler or tank 13 in considerable amount. With the arrangement of Figure 6, for low or dim operation of the burner 15, gas will be supplied to this burner so long as the valve 73 is in open position and independently of the closing of the outlet valve 34. Accordingly, if desired, the pilot burner 107 may be omitted, the thermocouple being so disposed that the hot juncture thereof is heated by a jet or flame of the main burner which, if desired, may be provided with a suitably directed jet opening or orifice for that purpose. It will also be understood that any other suitable known type of burner may be used in place of the burner 15 shown. It is also desirable that the flow of gas to the pilot burner, when used, be regulated, for which purpose fitting 105 is provided with a tapered plug valve 138 of known type held seated by a compression spring 139, in a known manner, this valve having a slotted stem extending above fitting 105 for reception of the blade of a screw driver, or other suitable instrument, whereby the valve may be turned to regulate the amount of gas flowing to the pilot burner 107.

It will be seen that under normal operating conditions, the control means of Figures 1 to 5, inclusive, and Figure 7, is automatically operative for supplying fuel to the main burner responsive to a desired minimum temperature and for cutting off the supply of fuel to the burner responsive to a desired maximum temperature, so long as the inlet valve 73 remains in its open position, the latter valve being automatically released from the electromagnet and closed responsive to objectionably high temperature in excess of the desired maximum and being maintained in closed position so long as such excess temperature persists, by disablement of the resetting means. Further, in the event of extinguishment of the pilot light, the electromagnet is deenergized, thereby causing closing of the inlet valve, which prevents flow of fuel to either the main burner or the pilot burner until the latter burner has been relighted. In the resetting operation, the reset button is pushed in so as to open the inlet valve 73 and move the armature 78 to its retracted position, after which the pilot burner 107 is ignited and the hot juncture 110 of the thermocouple is heated thereby, the reset button 99 being held in its inner position for a short time, until the coil of the electromagnet has been properly energized, after which button 99 may be released and returned to its normal outer position, the inlet valve 73 being then held in its open position by the electromagnet. The operation of the modified form shown in Figure 6 is the same as that above described, except that the outlet valve 34, when closed, does not completely cut off the supply of fuel to the main burner, which then burns dim or low, due to the restricted supply of fuel thereto through the orifice controlled by screw 136, it also being noted that in this modified form the pilot burner may be omitted, the thermocouple being so disposed that the hot juncture thereof is heated by a jet or flame from the main burner.

As above indicated, and as will be understood by those skilled in the art, changes in construction and arrangement of parts of my invention may be resorted to without departing from the field and scope thereof, and I intend to include all such variations, as fall within the scope of the appended claims, in this application, in which the preferred forms only of my invention have been disclosed.

I claim:

1. In control means of the character described, a main burner, a fuel supply conduit therefor, means comprising an inlet valve and an outlet valve for controlling flow of fuel through said conduit, means yieldingly urging said inlet valve in closing direction, a thermoelectric generator, electromagnetic means energized by said thermoelectric generator effective when energized for normally holding said inlet valve in open position, reset means for moving said inlet valve from closed to open position, thermoresponsive means subject to heat generated by said main burner effective for opening and closing said outlet valve responsive to a desired minimum temperature and a desired maximum temperature, and means responsive to said thermoresponsive means and operable at a temperature in excess of said desired maximum temperature to release said inlet valve from said electromagnetic means for movement to closed position and to prevent resetting said inlet valve to open position by said reset means until the temperature to which said thermoresponsive means is responsive drops below said excessive temperature.

2. In control means of the character described, a valve body having an inlet chamber and an outlet chamber with an outlet valve port therebetween, said inlet chamber having an inlet valve port, an inlet valve controlling said inlet port yieldingly urged in closing direction, a thermoelectric generator, electromagnetic means energized by said thermoelectric generator effective when energized for normally holding said inlet valve in open position, a reset lever connected to said inlet valve for moving the latter into open position and in closing direction, a reset stem slidable through said valve body for moving said lever in valve opening direction, and thermoresponsive means for opening and closing said outlet valve responsive to a desired minimum temperature and a desired maximum temperature, said thermoresponsive means comprising means for moving said lever in valve closing direction effective for releasing said inlet valve from said electromagnetic means responsive to temperature in excess of said desired maximum and for thereafter restraining said lever against movement in valve opening direction so long as such excess temperature persists.

3. In control means of the character described, a valve body having an inlet chamber and an outlet chamber with an outlet valve port therebetween, said inlet chamber having an inlet valve port, an inlet valve controlling said inlet port yieldingly urged in closing direction, a thermoelectric generator, electromagnetic means energized by said thermoelectric generator effective when energized for normally holding said inlet valve in open position, said inlet valve having a stem extending through said inlet port, an angle lever pivoted in said inlet chamber with one arm pivoted to said stem for moving said inlet valve into open position and in closing direction, a reset stem for moving said lever in valve opening direction, and thermoresponsive means for opening and closing said outlet valve responsive to a desired minimum temperature and a desired maximum temperature, said thermoresponsive means comprising a second lever having a part normally disengaged from the other arm of said first lever for movement of the latter into inlet valve opening position but engageable with said other arm for moving said first lever in inlet valve closing direction and thereafter restraining it against movement in inlet valve opening direction, responsive to temperature in excess of the desired maximum and so long as such excess temperature persists.

4. In control means of the character described, a valve body having an inlet chamber and an outlet chamber with an outlet valve port therebetween, said inlet chamber having an inlet valve port, an inlet valve controlling said inlet port yieldingly urged in closing direction, a thermoelectric generator, electromagnetic means energized by said thermoelectric generator effective when energized for normally holding said inlet valve in open position, said inlet valve having a stem extending through said inlet port, an angle lever pivoted in said inlet chamber with one arm pivoted to said stem for moving said inlet valve into open position and in closing direction, a reset stem slidable through said valve body into contact with the other arm of said lever for moving the latter into valve opening position, a second lever in said inlet chamber, a thermostat connected to said second lever for moving it in one direction responsive to a desired minimum temperature and in the opposite direction responsive to a desired maximum temperature, and means actuated by said second lever for opening and closing said outlet valve responsive to movement of said second lever in said one direction and in said opposite direction, said second lever being disposed to contact said other arm of said first lever and thereby move the latter in its other direction to release said inlet valve from said reset means, when the temperature to which said thermostat is subjected exceeds the desired maximum, and to thereafter obstruct movement of said other arm of said first lever and thereby restrain the latter against movement into valve opening position so long as such excess temperature persists.

5. In control means of the character described, a valve body having an inlet chamber and an outlet chamber with an outlet valve port therebetween, said inlet chamber having an inlet valve port, an inlet valve controlling said inlet port yieldingly urged in closing direction, electromagnetic means effective when energized for normally holding said inlet valve in open position, means for energizing said electromagnetic means, an outlet valve controlling said outlet port, means comprising a snap disc for opening said outlet valve by movement of said disc in one direction and closing it responsive to movement of said disc in the opposite direction, reset means for moving said inlet valve from closed to open position, thermoresponsive means, mechanical means actuated by said thermoresponsive means effective for causing movement of said disc in said one direction and in said other direction responsive to a desired minimum temperature and to a desired maximum temperature, and means responsive to said thermoresponsive means and operable at a temperature in excess of said desired maximum temperature to release said inlet valve from said electromagnetic means for movement to closed position and to prevent resetting said inlet valve to open position by said reset means until the temperature to which said thermoresponsive means is responsive drops below said excessive temperature.

6. In control means of the character described, a valve body having an inlet chamber and an outlet chamber with an outlet valve port therebetween and a slotted neck extending from said outlet chamber into said inlet chamber, said inlet chamber having an inlet valve port, a snap disc mounted at its edge in said neck, an outwardly opening and inwardly closing valve controlling said outlet port yieldingly urged inward and having an inwardly extending stem disposed with its inner end adjacent said disc to be contacted thereby for opening said valve when said disc is flexed outward, a disc follower slidable in the inner end of said neck having on its outer face an annular element contacting said disc adjacent the edge thereof, a valve operating lever pivoted intermediate its ends in said inlet chamber with one arm contacting the inner face of said follower, a thermostat connected to the other arm of said lever effective for moving said one arm thereof outward and inward for opening and closing said outlet valve responsive to a desired minimum temperature and a desired maximum temperature, an inlet valve controlling said inlet port yieldingly urged in closing direction, a thermoelectric generator, electromagnetic means energized by said thermoelectric generator effective for normally holding said inlet valve in open position, reset means for moving said inlet valve from closed to open position, and means responsive to said thermoresponsive means and operable at a temperature in excess of said desired maximum temperature to release said inlet valve from said electromagnetic means for movement to closed position and to prevent resetting said inlet valve to open position by said reset means until the temperature to which said thermoresponsive means is responsive drops below said excessive temperature.

7. In a device of the class described, in combination, an electromagnet, an armature for said electromagnet, a valve member connected to said armature, a thermocouple subject to the heat of a flame and connected in circuit with said electromagnet whereby normally said armature is held in attracted position and said valve member in open position by the thermoelectric current flowing through said electromagnet when said thermocouple is heated by said flame but on extinguishment of said flame said valve member is moved to closed position by the release of said armature by said electromagnet, reset means for resetting said armature to attracted position and said valve member to open position, and thermostat controlled means operable at a predetermined temperature to release said armature from said electromagnet for movement of said valve member to closed position and to prevent resetting said armature to attracted position and said valve member to open position by said reset means until the temperature to which said thermostat is subject drops below said predetermined temperature.

8. In a device of the class described, in combination, an electromagnet, an armature for said electromagnet, a controlling member connected to said armature, a thermocouple subject to the heat of a flame and connected in circuit with said electromagnet whereby normally said armature is held in attracted position and said controlling member in a first position by the thermoelectric current flowing through said electromagnet when said thermocouple is heated by said flame but on extinguishment of said flame said controlling member is moved to a second position by the release of said armature by said electromagnet, reset means for resetting said armature to attracted position and said controlling member to said first position, and thermostat controlled means operable at a predetermined temperature to release said armature from said electromagnet for movement of said controlling member to said second position and to prevent resetting said armature to attracted position and said controlling member to said first position by said reset means until the temperature to which said thermostat is subject drops below said predetermined temperature.

9. In a device of the class described, in combination, an electromagnet, an armature for said electromagnet, a first valve member connected to said armature, a thermocouple subject to the heat of a flame and connected in circuit with said electromagnet whereby normally said armature is held in attracted position and said first valve member is held in open position by the thermoelectric current flowing through said electromagnet when said thermocouple is heated by said flame but on extinguishment of said flame said first valve member is moved to closed position by the release of said armature by said electromagnet, reset means for resetting said armature to attracted position and said first valve member to open position, thermostat controlled means operable at a predetermined temperature to release said armature from said electromagnet for movement of said first valve member to closed position and to prevent resetting said armature to attracted position and said first valve member to open position by said reset means until the temperature to which said thermostat is subject drops below said predetermined temperature, and a second valve member in series with said first valve member and actuated between closed and open positions by said thermostat controlled means at temperatures below said predetermined temperature.

10. In a device of the class described, in combination, an electromagnet, an armature for said electromagnet, a first controlling member connected to said armature, a thermocouple subject to the heat of a flame and connected in circuit with said electromagnet whereby normally said armature is held in attracted position and said first controlling member in a first position by the thermoelectric current flowing through said electromagnet when said thermocouple is heated by said flame but on extinguishment of said flame said first controlling member is moved to a second position by the release of said armature by said electromagnet, reset means for resetting said armature to attracted position and said first controlling member to said first position, thermostat controlled means operable at a predetermined temperature to release said armature from said electromagnet for movement of said first controlling member to said second position and to prevent resetting said armature to attracted position and said controlling member to said first position by said reset means until the temperature to which said thermostat is subject drops below said predetermined temperature, and a second controlling member actuated between operating and shutoff positions by said thermostat controlled means at temperatures below said predetermined temperature.

11. In a device of the class described, in combination, an electromagnet, an armature for said electromagnet, a valve member connected to said armature, a thermocouple subject to the heat of a flame and connected in circuit with said electromagnet whereby normally said armature is held in attracted position and said valve in open position by the thermoelectric current flowing through said electromagnet when said thermocouple is heated by said flame, but on extinguishment of said flame said valve member is moved to closed position by the release of said armature by said electromagnet, a reset stem for resetting said armature to attracted position and said valve member to open position, a thermostat, an arm controlled by said thermostat, and a pivoted bell crank lever having one arm connected to said valve member and another arm positioned between and cooperable with said thermostat controlled arm and said reset stem, said thermostat controlled arm and said bell crank lever being operable at a predetermined temperature sensed by the thermostat to release said armature from said electromagnet for movement of said valve member to closed position and to prevent resetting said armature to attracted position and said valve member to open position by said reset stem until the temperature to which said thermostat is subject drops below said predetermined temperature.

12. In a device of the class described, in combination, an electromagnet, an armature for said electromagnet, a controlling member connected to said armature, a thermocouple subject to the heat of a flame and connected in circuit with said electromagnet whereby normally said armature is held in attracted position and said controlling member in first position by the thermoelectric current flowing through said electromagnet when said thermocouple is heated by said flame but on extinguishment of said flame said controlling member is moved to a second position by the release of said armature by said electromagnet, a reset stem for resetting said armature to attracted position and said controlling member to said first position, a thermostat, an arm controlled by said thermostat, and a pivoted bell crank lever having one arm connected to said controlling member and another arm positioned between and cooperable with said thermostat controlled arm and said reset stem, said thermostat controlled arm and said bell crank lever being operable at a predetermined temperature sensed by the thermostat to release said armature from said electromagnet for movement of said controlling member to said second position and to prevent resetting said armature to attracted position and said controlling member to said first position by said reset stem until the temperature to which said thermostat is subject drops below said predetermined temperature.

13. In a device of the class described, in combination, an electromagnet, an armature for said electromagnet, a first valve member connected to said armature, a thermocouple subject to the heat of a flame and connected in circuit with said electromagnet whereby normally said armature is held in attracted position and said valve member is held in open position by the thermoelectric current flowing through said electromagnet when said thermocouple is heated by said flame but on extinguishment of said flame said first valve member is moved to closed position by the release of said armature by said electromagnet, a reset stem for resetting said armature to attracted position and said first valve member to open position, a thermostat, an arm controlled by said thermostat, a pivoted bell crank lever having one arm connected to said first valve member and another arm positioned between and cooperable with said thermostat controlled arm and said reset stem, said thermostat controlled arm and said bell crank lever being operable at a predetermined temperature sensed by the thermostat to release said armature from said electromagnet for movement of said first valve member to closed position and to prevent resetting said armature to attracted position and said first valve member to open position by said reset stem until the temperature to which said thermostat is subject drops below said predetermined temperature, and a second valve member in series with said first valve member and actuated between closed and open positions by said thermostat controlled arm at temperatures below said predetermined temperature.

HENRY F. ALFERY.